US008429745B1

(12) United States Patent
Casaburi et al.

(10) Patent No.: US 8,429,745 B1
(45) Date of Patent: Apr. 23, 2013

(54) SYSTEMS AND METHODS FOR DATA LOSS PREVENTION ON MOBILE COMPUTING SYSTEMS

(75) Inventors: Jim Casaburi, Rancho Palos Verdes, CA (US); Kent Griffin, Sandy, UT (US); Susanta Nanda, Los Angeles, CA (US); Sanjay Sawhney, Cupertino, CA (US); Matthew Conover, East Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 46 days.

(21) Appl. No.: 13/243,198

(22) Filed: Sep. 23, 2011

(51) Int. Cl.
*G06F 21/00* (2006.01)
(52) U.S. Cl.
USPC ........... 726/22; 726/26; 726/30; 726/1; 726/2
(58) Field of Classification Search .................... 726/26, 726/30, 22, 1, 2
See application file for complete search history.

(56) References Cited

U.S. PATENT DOCUMENTS

| 8,286,253 | B1* | 10/2012 | Lu et al. ......................... 726/26 |
| 2008/0310736 | A1* | 12/2008 | Chattopadhyay et al. ..... 382/218 |
| 2012/0044137 | A1* | 2/2012 | Oddiraju et al. .............. 345/156 |
| 2012/0183174 | A1* | 7/2012 | Basavapatna et al. ........ 382/100 |
| 2012/0210437 | A1* | 8/2012 | Karande et al. ................. 726/26 |

OTHER PUBLICATIONS iPhone Monsta; How to Disable you iPhone's Screenshot Flash; http://iphonemonsta.com/no-screenshot-flash-iphone-ios-cydia; Feb. 23, 2011.
iPhone Monsta; NoSBScreen Completely Disables 'Screenshots' on Your iPhone; http://iphonemonsta.com/nosbscreen-disable-screenshots-iphone-ios-cydia-tweak; Apr. 11, 2011.
Three Teck Noobs; NoSBScreen Cydia Tweak is Released to Completely Disable 'Screenshots' on Your iPhone; http://www.3noobs.com/nosbscreen-cydia-app-to-completely-disable-screenshots-on-iphone/; Apr. 17, 2011.
Stackoverflow; Circumvent Screenshot for iOS 4; https://media.blackhat.com/bh-eu-11/Nitesh_Dhanjani/BlackHat_EU_2011_Dhanjani_Attacks_Against_Apples_iOS-WP.pdf http://stackoverflow.com/questions/3350145/circumvent-screenshot-for-ios-4; Jul. 28, 2010.
Ben Jackson et al.; I Can Stalk U; http://icanstalku.com/how.php; Taken from site on Aug. 8, 2011.

* cited by examiner

*Primary Examiner* — Jeffrey Pwu
*Assistant Examiner* — William Corum, Jr.
(74) *Attorney, Agent, or Firm* — ALG Intellectual Property, LLC

(57) ABSTRACT

A computer-implemented method for data loss prevention on mobile computing systems may include (1) identifying a mobile computing system configured to execute only one application at a time as a foreground application, (2) determining that the mobile computing system has begun executing a sensitive application as the foreground application, (3) identifying a first enumeration of screenshots stored on the mobile computing system when the mobile computing system began executing the sensitive application as the foreground application, (4) identifying a second enumeration of screenshots stored on the mobile computing system, (5) determining that at least one new screenshot was taken on the mobile computing system while the sensitive application was the foreground application by detecting a difference between the first enumeration and the second enumeration, and (6) performing a security action upon detecting the difference. Various other methods, systems, and computer-readable media are also disclosed.

20 Claims, 7 Drawing Sheets

SYSTEMS AND METHODS FOR DATA LOSS PREVENTION ON MOBILE COMPUTING SYSTEMS

BACKGROUND

In the electronic information age, individuals and organizations may quickly and easily share, access, and disseminate high volumes of information. For many individuals and organizations, the ease with which information may be disseminated electronically is empowering. However, the ubiquity of high-speed Internet access and smart mobile devices may pose unique challenges for individuals and organizations concerned with preventing the loss and/or exposure of sensitive data. Individuals and organizations are therefore increasingly looking for solutions to control the distribution of sensitive data.

Traditional computing security solutions may include installing system-level software, such as data loss prevention software, on a computing system to monitor activity on the computing system and prevent operations that would copy and/or distribute sensitive data. However, some mobile computing platforms are restricted and/or closed, discouraging and/or preventing users from installing software of their choice and/or from installing system-level software that would provide sufficient access for a data loss prevention system to operate effectively.

One alternative to installing system-level data loss prevention software on restricted and/or closed mobile computing systems may entail creating a custom application for a mobile platform to retrieve, store, and handle sensitive data without sharing the data with other applications on the mobile platform. However, some mobile platforms may still provide global features that can inspect and/or copy data handled by individual applications. For example, many mobile platforms may include an integrated screenshot tool that may allow a user to quickly copy sensitive data displayed by an application, effectively circumventing the protection offered by the custom application. Accordingly, the instant disclosure identifies a need for additional and improved systems and methods for data loss prevention on mobile computing systems.

SUMMARY

As will be described in greater detail below, the instant disclosure generally relates to systems and methods for preventing data loss on restricted and/or closed mobile computing systems by monitoring or tracking such systems for new screenshots taken while applications that may display sensitive data are in the foreground. In one example, a computer-implemented method for accomplishing such a task may include (1) identifying a mobile computing system that is configured to execute only one application at a time as a foreground application, (2) determining that the mobile computing system has begun executing a sensitive application as the foreground application, (3) in response to determining that the mobile computing system is executing the sensitive application as the foreground application, identifying a first enumeration of screenshots stored on the mobile computing system when the mobile computing system began executing the sensitive application as the foreground application, (4) identifying a second enumeration of screenshots stored on the mobile computing system after the mobile computing system began executing the sensitive application as the foreground application, (5) determining that at least one new screenshot was taken on the mobile computing system while the sensitive application was the foreground application by detecting a difference between the first enumeration of screenshots and the second enumeration of screenshots, and (6) performing a security action upon detecting the difference between the first enumeration of screenshots and the second enumeration of screenshots.

In one example, the mobile computing system may be further configured with a foreground application display area for displaying the foreground application. In some examples, the computer-implemented method may also include identifying a global screenshot location on the mobile computing system that is designated for storing application-independent screenshots taken on the mobile computing system. In these examples, identifying the first enumeration of screenshots may include enumerating screenshots stored at the global screenshot location.

In some embodiments, identifying the second enumeration of screenshots may include determining that the mobile computing system ceased executing the sensitive application as the foreground application. In these embodiments, identifying the second enumeration of screenshots may also include, in response to determining that the mobile computing system ceased executing the sensitive application as the foreground application, enumerating screenshots stored on the mobile computing system when the mobile computing system ceased executing the sensitive application as the foreground application. In some examples, determining that the mobile computing system ceased executing the sensitive application as the foreground application may include determining that the mobile computing system switched the sensitive application from executing as the foreground application to being a background application. Likewise, in some embodiments, determining that the mobile computing system has begun executing the sensitive application as the foreground application may include determining that the mobile computing system switched the sensitive application from being a background application to executing as the foreground application.

In one embodiment, a system for implementing the above-described method may include an identification module programmed to identify a mobile computing system that is configured to execute only one application at a time as a foreground application. The system may also include a monitoring module programmed to determine that the mobile computing system has begun executing a sensitive application as the foreground application. The system may additionally include an enumeration module programmed to, in response to determining that the mobile computing system is executing the sensitive application as the foreground application, identify a first enumeration of screenshots stored on the mobile computing system when the mobile computing system began executing the sensitive application as the foreground application. The enumeration module may also be programmed to identify a second enumeration of screenshots stored on the mobile computing system after the mobile computing system began executing the sensitive application as the foreground application. The system may further include a determination module programmed to determine that at least one new screenshot was taken on the mobile computing system while the sensitive application was the foreground application by detecting a difference between the first enumeration of screenshots and the second enumeration of screenshots. The system may also include a performing module programmed to perform a security action upon detecting the difference between the first enumeration of screenshots and the second enumeration of screenshots. The system may additionally include at least one processor configured to execute the identification module, the monitoring module, the enumeration module, the determination module, and the performing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a mobile computing system that is configured to execute only one application at a time as a foreground application, (2) determine that the mobile computing system has begun executing a sensitive application as the foreground application, (3) in response to determining that the mobile computing system is executing the sensitive application as the foreground application, identify a first enumeration of screenshots stored on the mobile computing system when the mobile computing system began executing the sensitive application as the foreground application, (4) identify a second enumeration of screenshots stored on the mobile computing system after the mobile computing system began executing the sensitive application as the foreground application, (5) determine that at least one new screenshot was taken on the mobile computing system while the sensitive application was the foreground application by detecting a difference between the first enumeration of screenshots and the second enumeration of screenshots, and (6) perform a security action upon detecting the difference between the first enumeration of screenshots and the second enumeration of screenshots.

As will be explained in greater detail below, by monitoring or tracking a mobile computing system for new screenshots taken while an application that may display sensitive data is in the foreground, the systems and methods described herein may prevent unwanted copying and/or distribution of sensitive data displayed within the application. Furthermore, these systems and methods may do so while still conforming to strict mobile platform restrictions that may otherwise hamper traditional mobile data loss prevention systems. Additionally, these systems and methods may effectively protect sensitive data without requiring that the screenshot feature of a mobile computing system be entirely disabled. In some examples, these systems and methods may effectively operate without depending on details of the timing and/or notification mechanisms of a screenshot tool.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
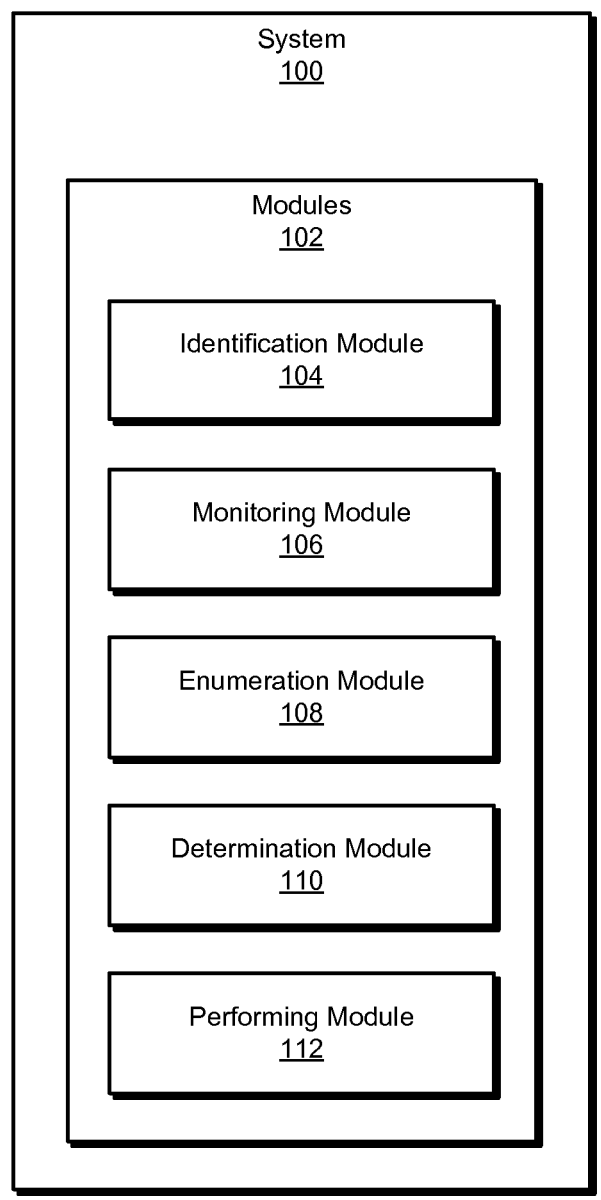
FIG. 1 is a block diagram of an exemplary system for data loss prevention on mobile computing systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
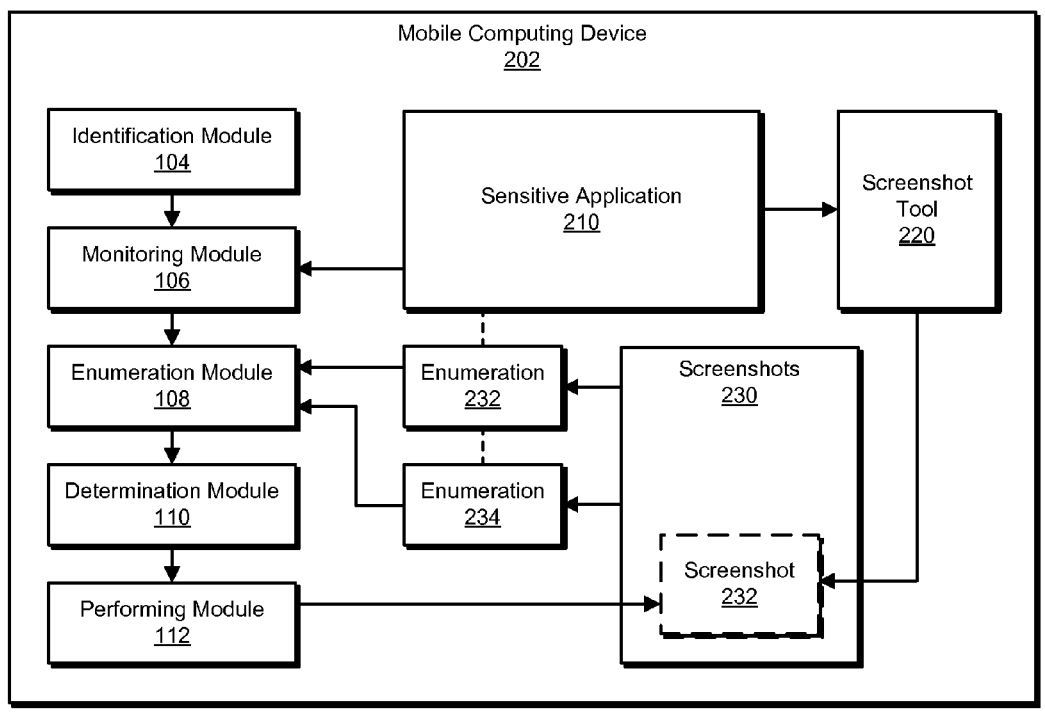
FIG. 2 is a block diagram of an exemplary system for data loss prevention on mobile computing systems.

The following will provide, with reference to FIGS. 1-2, detailed descriptions of exemplary systems for data loss prevention on mobile computing systems. Detailed descriptions of corresponding computer-implemented methods will also be provided in connection with FIG. 3. Detailed descriptions of an exemplary mobile computing system and of an exemplary timeline of activity on a mobile computing system will be provided in connection with FIGS. 4 and 5, respectively. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for data loss prevention on mobile computing systems. As illustrated in this figure, exemplary system 100 may include one or more modules 102 for performing one or more tasks. For example, and as will be explained in greater detail below, exemplary system 100 may include an identification module 104 programmed to identify a mobile computing system that is configured to execute only one application at a time as a foreground application. Exemplary system 100 may also include a monitoring module 106 programmed to determine that the mobile computing system has begun executing a sensitive application as the foreground application. Exemplary system 100 may additionally include an enumeration module 108 programmed to, in response to the determination that the mobile computing system is executing the sensitive application as the foreground application, identify a first enumeration of screenshots stored on the mobile computing system when the mobile computing system began executing the sensitive application as the foreground application. Enumeration module 108 may also be programmed to identify a second enumeration of screenshots stored on the mobile computing system after the mobile computing system began executing the sensitive application as the foreground application.

In addition, and as will be described in greater detail below, exemplary system 100 may include a determination module 110 programmed to determine that at least one new screenshot was taken on the mobile computing system while the sensitive application was the foreground application by detecting a difference between the first enumeration of screenshots and the second enumeration of screenshots.

Exemplary system 100 may also include a performing module 112 programmed to perform a security action upon detecting the difference between the first enumeration of screenshots and the second enumeration of screenshots. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as mobile computing device 202 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a mobile computing device 202 executing a sensitive application 210 (e.g., an application potentially displaying sensitive data).

In one embodiment, one or more of modules 102 from FIG. 1 may, when executed by at least one processor of mobile computing device 202, facilitate mobile computing device 202 in preventing data loss. In some examples, one or more of modules 102 may operate as a part of sensitive application 210. For example, and as will be described in greater detail below, one or more of modules 102 may cause mobile computing device 202 to (1) determine that mobile computing device 202 has begun executing sensitive application 210 as the foreground application, (2) in response to the determination that mobile computing device 202 is executing sensitive application 210 as the foreground application, identify an enumeration 232 of screenshots 230 (taken, e.g., by a screenshot tool 220) stored on mobile computing device 202 when mobile computing device 202 began executing sensitive application 210 as the foreground application, (3) identify a second enumeration 234 of screenshots 230 stored on mobile computing device 202 after mobile computing device 202 began executing sensitive application 210 as the foreground application, (4) determine that at least one new screenshot (e.g., a screenshot 232) was taken on mobile computing device 202 while sensitive application 210 was the foreground application by detecting a difference between enumeration 232 of screenshots 230 and enumeration 234 of screenshots 230, and (5) perform a security action upon detecting the difference between enumeration 232 of screenshots 230 and enumeration 234 of screenshots 230.

Mobile computing device 202 generally represents any type or form of computing device capable of reading computer-executable instructions. Examples of mobile computing device 202 include, without limitation, cellular phones, tablet computing devices, e-book readers, personal digital assistants (PDAs), netbooks, multimedia players, embedded systems, combinations of one or more of the same, exemplary computing system 610 in FIG. 6, or any other suitable computing device.

Figure 3:
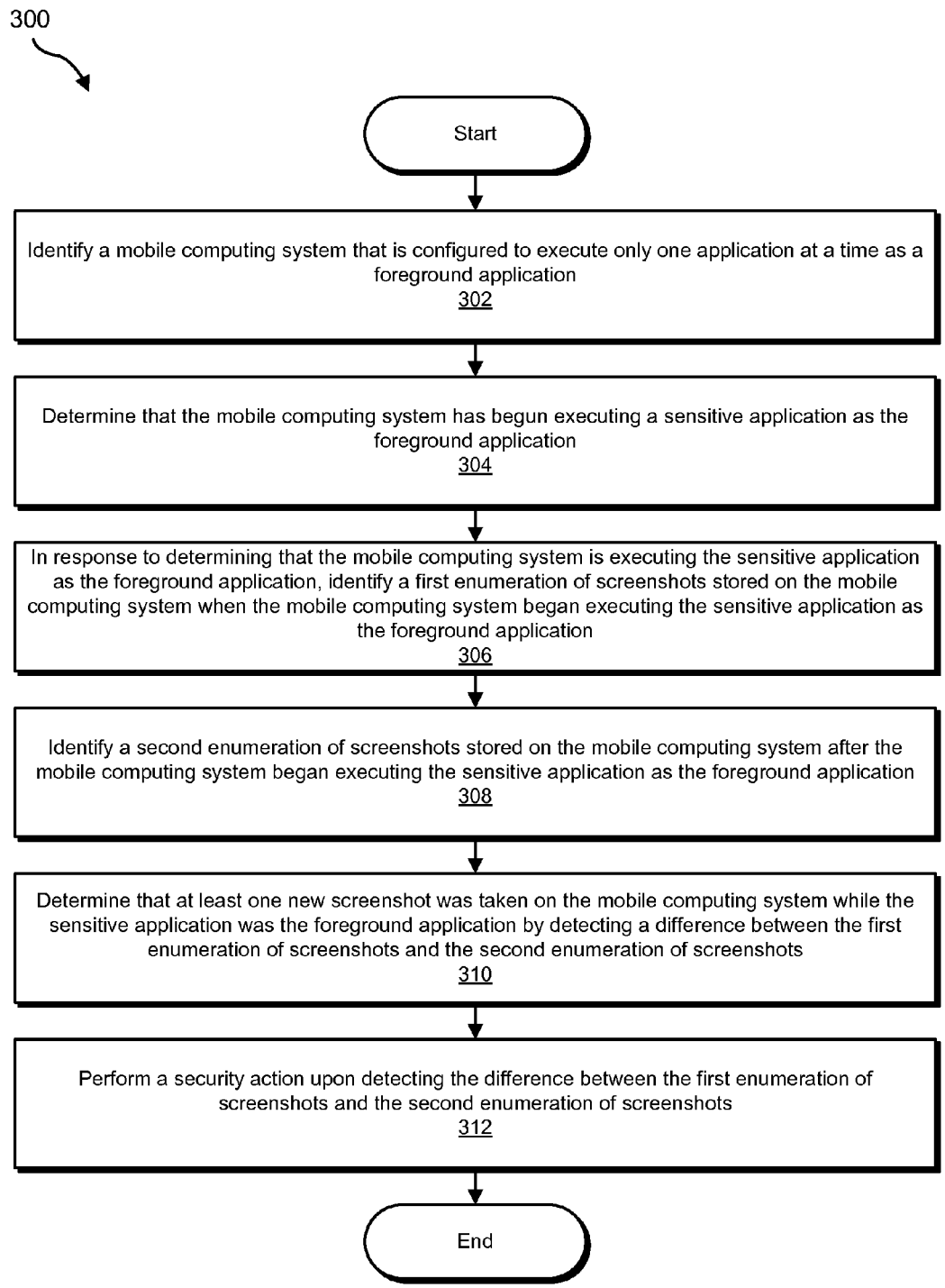
FIG. 3 is a flow diagram of an exemplary method for data loss prevention on mobile computing systems.

FIG. 3 is a flow diagram of an exemplary computer-implemented method 300 for data loss prevention on mobile computing systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a mobile computing system that is configured to execute only one application at a time as a foreground application. For example, at step 302 identification module 104 may, as part of mobile computing device 202 in FIG. 2, determine that mobile computing device 202 is configured to execute only one application at a time as a foreground application.

As previously noted, a mobile computing system may include a mobile phone, a tablet computer, an e-book reader, a personal digital assistant, and the like. The phrase "mobile computing system" may also generally refer to any other portable device that may have wireless connectivity to the Internet. Mobile-computing systems may include GPS devices, messaging devices, and various other types of mobile devices.

In some examples, the mobile computing system may use a restricted mobile platform that may interfere with some traditional methods for data loss prevention. For example, the mobile computing system may restrict modifications to system-level and/or base functionality. In some examples, the restricted mobile platform may limit the ability of third-party software to inspect network traffic, modify the behavior of other applications, and/or modify data in movement and/or at rest. The restricted mobile platform may enforce these limitations as a part of the hardware of mobile computing system and/or as a part of the operating system of the mobile computing device. In some examples, the restricted mobile platform may extend to an application store with exclusive privileges to allow certain configurations and/or software installations on the mobile computing system. In some examples, restrictions on the mobile platform may be enforced by decisions regarding whether to make an application available and/or visible in the application store. In some examples, restrictions on the mobile platform may hamper the use of third-party security software on the mobile platform by making use of the third-party security software difficult and/or costly, and/or by reducing features and/or the reliability of the mobile platform when third-party security software is installed. As an example, the mobile computing system may run on the APPLE IOS platform.

As used herein, the phrase "foreground application" may refer to any application that is currently displayed and/or currently prominently displayed on the mobile computing system. Additionally or alternatively, the phrase "foreground application" may refer to an application that is both currently displayed and currently executing. In some examples, the phrase "foreground application" may refer to an application that has the highest execution priority and/or highest display priority. In some examples, the phrase "foreground application" may exclude system services, system interface programs, and/or interface applications which temporarily overlay and/or share screen space with the current foreground application. In another example, the phrase "foreground application" may refer to any application currently displayed by the mobile computing system. Additionally or alternatively, the phrase "foreground application" may refer to an application whose display consumes more than half of the display area of the mobile computing device.

In some examples, the mobile computing system may be further configured with a foreground application display area for displaying the foreground application. The foreground application display area may be configured to only display the foreground application when a foreground application is running in the foreground. Additionally or alternatively, the foreground application display area may also display global system interface elements (e.g., menus, soft keyboards, taskbars, docking bars, status bars, etc.).

Identification module 104 may identify the mobile computing system in step 302 in any suitable manner. For example, identification module 104 may identify the mobile computing system by executing on the mobile computing system. As mentioned earlier, in some examples, identification module 104 may execute as a part of a sensitive application. In these examples, identification module 104 may identify the mobile computing system by executing as a part of the sensitive application configured for execution on the mobile computing system.

Figure 4:
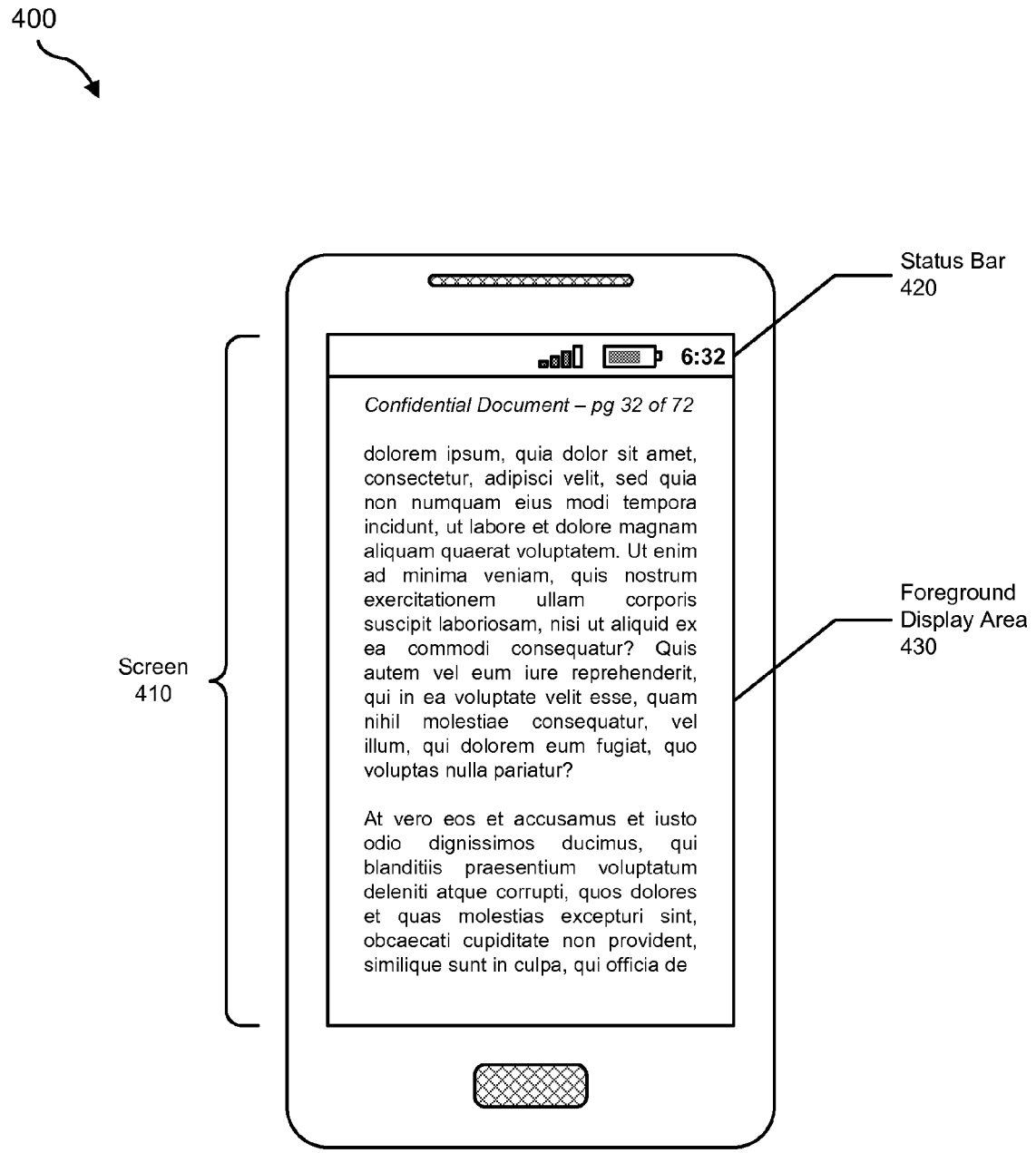
FIG. 4 is an illustration of an exemplary mobile computing system requiring data loss prevention.

FIG. 4 illustrates an exemplary mobile computing system 400. As shown in FIG. 4, the mobile computing system 400 may include a screen 410 for a display. In some examples, screen 410 may be used by mobile computing system 400 to display global interface elements such as a status bar 420. Additionally, screen 410 may be used by mobile computing system 400 to display a foreground application in a foreground display area 430. Using FIG. 4 as an example, at step 302 identification module 104 may identify mobile computing system 400 (e.g., simply by executing as a part of the displayed foreground application).

Returning to FIG. 3, at step 304 one or more of the systems described herein may determine that the mobile computing system has begun executing a sensitive application as the foreground application. For example, at step 304 monitoring module 106 may, as part of mobile computing device 202 in FIG. 2, determine that mobile computing device 202 has begun executing sensitive application 210 as the foreground application.

As used herein, the phrase "sensitive application" may refer to any application that may be used to display information that is private, privileged, confidential, and/or subject to one or more data loss prevention policies. Generally, the phrase "sensitive application" may refer to any application which may have screenshots of interest taken of its display, to which screenshots an automated task may apply. For example, a sensitive application may include an application for safely viewing sensitive data on a mobile computing device. As mentioned earlier, in some examples, the sensitive application may include one or more of the modules described herein in order to track, manipulate, and/or control screenshots taken of its display.

Monitoring module 106 may determine that the mobile computing system has begun executing the sensitive application as the foreground application in any suitable manner. For example, monitoring module 106 may determine that the mobile computing system has begun executing the sensitive application as the foreground application by operating as a part of the sensitive application (e.g., and, therefore, executing when the sensitive application is executed). For example, the sensitive application may include a hook to execute one or more instructions whenever the sensitive application begins executing in the foreground. In some contexts, monitoring module 106 may determine that the mobile computing system has begun executing the sensitive application as the foreground application when the mobile computing system launches the sensitive application. In other contexts, monitoring module 106 may determine that the mobile computing system has begun executing the sensitive application as the foreground application by determining that the mobile computing system switched the sensitive application from being a background application to executing as the foreground application. For example, monitoring module 106 may determine that the sensitive application has gained the ability to display data to a foreground display area of the mobile computing system.

Figure 5:
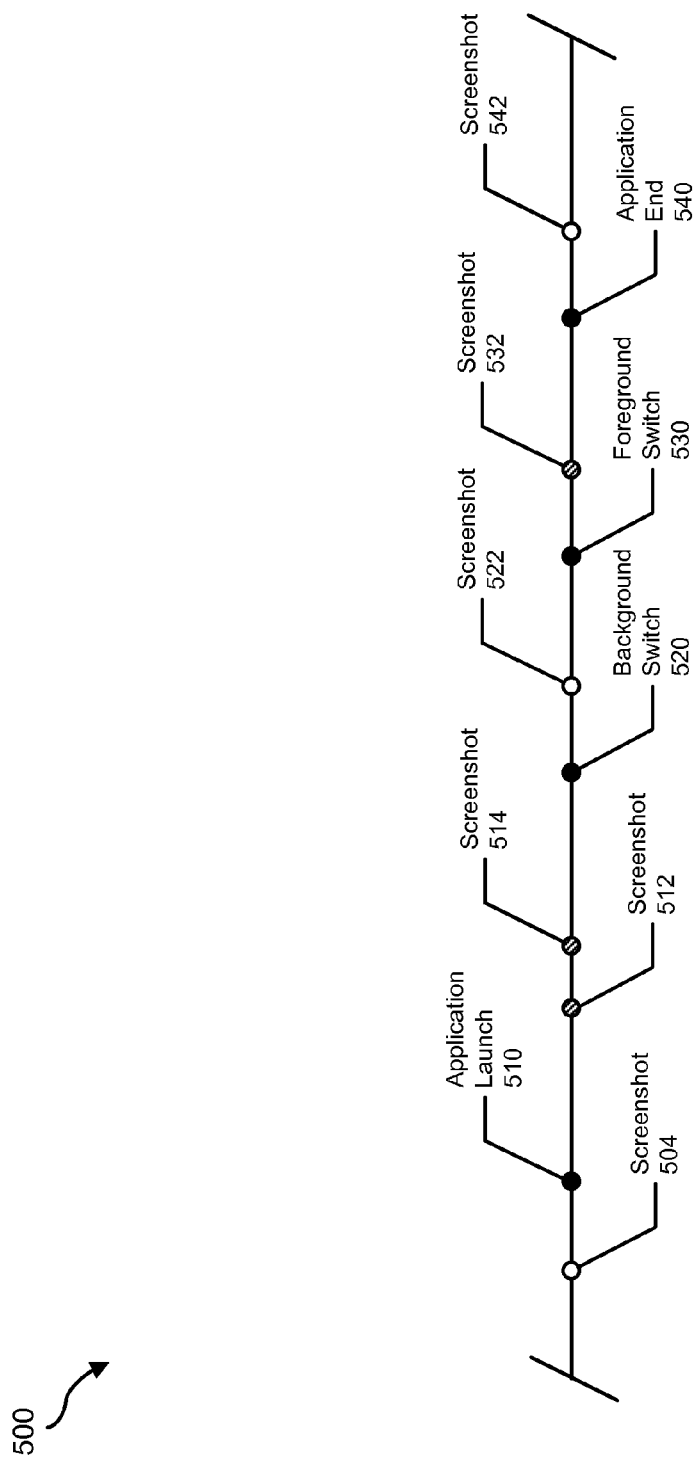
FIG. 5 is an illustration of an exemplary timeline of activities on a mobile computing system requiring data loss prevention.

FIG. 5 illustrates an exemplary timeline 500 of activity on a mobile computing system. As shown in FIG. 5, a screenshot 504 may be taken of the mobile computing system display. An application launch 510 may then start execution of the sensitive application and place the sensitive application in the foreground. Screenshots 512 and 514 may then be taken of the sensitive application. A background switch 520 may then place the sensitive application in the background (e.g., while another application executes and displays in the foreground instead). A screenshot 522 may then be taken of the mobile computing system display. A foreground switch 530 may then move the sensitive application from the background back to the foreground. A screenshot 532 may then be taken of the sensitive application. An application end 540 may then mark the termination of the sensitive application. A screenshot 542 may then be taken of the mobile computing system display.

Using FIG. 5 as an example, at application launch 510, monitoring module 106 may determine that the mobile computing system has begun executing the sensitive application as the foreground application. Likewise, at foreground switch 530, monitoring module 106 may determine that the mobile computing system has begun (e.g., again) executing the sensitive application as the foreground application.

Returning to FIG. 3, at step 306 one or more of the systems described herein may, in response to the determination that the mobile computing system is executing the sensitive application as the foreground application, identify a first enumeration of screenshots stored on the mobile computing system when the mobile computing system began executing the sensitive application as the foreground application. For example, at step 306 enumeration module 108 may, as part of mobile computing device 202 in FIG. 2 and in response to the determination that mobile computing device 202 is executing sensitive application 210 as the foreground application, identify enumeration 232 of screenshots 230 stored on mobile computing device 202 when mobile computing device 202 began executing sensitive application 210 as the foreground application.

Enumeration module 108 may enumerate the screenshots in any of a variety of ways. For example, enumeration module 108 may count (or identify a count) of screenshots stored on the mobile computing system. Additionally or alternatively, enumeration module 108 may create a list (or identify a list) of screenshots stored on the mobile computing system.

Enumeration module 108 may enumerate any the screenshots according to any suitable method and/or criteria. For example, enumeration module 108 may identify a global screenshot location on the mobile computing system that is designated for storing application-independent screenshots taken on the mobile computing system. In this example, enumeration module 108 may identify the first enumeration of screenshots by enumerating screenshots stored at the global screenshot location. The global screenshot location may include any suitable location and/or method of grouping files. In some examples, the global screenshot location may include a directory and/or folder. Additionally or alternatively, the global screenshot location may include a database. In some examples, the global screenshot location may include a tag. Additionally or alternatively, the global screenshot location may include a programmatic interface. Generally, the global screenshot location may include any data structure, view, and/or retrieval point for identifying and/or enumerating screenshots on the mobile computing system.

In some examples, enumeration module 108 may identify an enumeration of only a subset of all screenshots that are stored on the mobile computing system. For example, enumeration module 108 may identify only screenshots stored in a predetermined location and/or screenshots taken with a predefined screenshot tool (e.g., a global screenshot tool capable of taking screenshots while the sensitive application runs in the foreground). Additionally or alternatively, enumeration module 108 may identify an enumeration of only previously unidentified screenshots (e.g., screenshots not previously enumerated by enumeration module 108).

Using FIG. 5 as an example, at step 306 enumeration module 108 may, in response to application launch 510, identify the screenshots stored on the mobile computing system at the time of application launch 510. For example, enumeration module 108 may identify screenshot 504 as the sole existing screenshot. Additionally or alternatively, enumeration module 108 may identify that one screenshot existed at the time of application launch 510. As another example, at step 306 enumeration module 108 may, in response to foreground switch 530, identify the screenshots stored on the mobile computing system at the time of foreground switch 530. For example, enumeration module 108 may identify and/or create a list of screenshots 504, 512, 514, and 522. Additionally or alternatively, enumeration module 108 may identify that four screenshots existed at the time of foreground switch 530.

Returning to FIG. 3, at step 308 one or more of the systems described herein may identify a second enumeration of screenshots stored on the mobile computing system after the mobile computing system began executing the sensitive application as the foreground application. For example, at step 308 enumeration module 108 may, as part of mobile computing device 202 in FIG. 2, identify second enumeration 234 of screenshots 230 stored on mobile computing device 202 after mobile computing device 202 began executing sensitive application 210 as the foreground application.

Enumeration module 108 may identify the second enumeration of screenshots in any suitable manner. For example, enumeration module 108 may use any of the methods and/or techniques used to identify the first enumeration of screenshots. For example, enumeration module 108 may count (or identify a count) of screenshots stored on the mobile computing system. Additionally or alternatively, enumeration module 108 may create a list (or identify a list) of screenshots stored on the mobile computing system.

Enumeration module 108 may identify the second enumeration of screenshots in any of a variety of contexts. For example, enumeration module 108 may identify the second enumeration of screenshots upon determining that the mobile computing system ceased executing the sensitive application as the foreground application. In this example, enumeration module 108 may, in response to determining that the mobile computing system ceased executing the sensitive application as the foreground application, enumerate screenshots stored on the mobile computing system when the mobile computing system ceased executing the sensitive application as the foreground application.

Enumeration module 108 may determine that the mobile computing system ceased executing the sensitive application as the foreground application in any of a variety of contexts. In one example, enumeration module 108 may determine that enumeration module 108 is terminating, and, accordingly, identify the second enumeration of screenshots before and/or at the time of termination. As another example, enumeration module 108 may determine that the mobile computing system switched the sensitive application from executing as the foreground application to being a background application. For example, the sensitive application may include a hook configured to execute enumeration module 108 (and/or one or more instructions resulting in the execution of enumeration module 108) when the sensitive application is set to terminate and/or move to the background.

In some examples, enumeration module 108 may enumerate the screenshots stored on the mobile computing system on a periodic basis after the mobile computing system begins executing the sensitive application as the foreground application. In this manner, the systems and methods described herein may be able to identify screenshots taken while the sensitive application is in the foreground before the sensitive application is moved to the background and/or terminated, thereby potentially preventing the transfer of any such screenshots by an automated mechanism (e.g., a cloud backup), a connected external device, or the like.

Using FIG. 5 as an example, at step 308 enumeration module 108 may identify the screenshots stored on the mobile computing system at the time of background switch 520. For example, enumeration module 108 may list screenshots 504, 512, and 514. Additionally or alternatively, enumeration module 108 may identify that three screenshots existed at the time of background switch 520. As another example, at step 306 enumeration module 108 may identify the screenshots stored on the mobile computing system at time of application end 540. For example, enumeration module 108 may identify and/or create a list of screenshots 504, 512, 514, 522, and 532. Additionally or alternatively, enumeration module 108 may identify that five screenshots existed at the time of application end 540.

Returning to FIG. 3, at step 310 one or more of the systems described herein may determine that at least one new screenshot was taken on the mobile computing system while the sensitive application was the foreground application by detecting a difference between the first enumeration of screenshots and the second enumeration of screenshots. For example, at step 310 determination module 110 may, as part of mobile computing device 202 in FIG. 2, determine that at least one new screenshot (e.g., screenshot 232) was taken on mobile computing device 202 while sensitive application 210 was the foreground application by detecting a difference between enumeration 232 of screenshots 230 and enumeration 234 of screenshots 230.

Determination module 110 may detect the difference between the first and second enumerations in any suitable manner. For example, where the first and second enumerations include lists of the screenshots, determination module 110 may detect the difference by comparing the lists and identifying one or more screenshots listed in the second enumeration that are not listed in the first enumeration. As another example, where the first and second enumerations each include a number, determination module 110 may detect the difference by comparing the numbers and determining that the number of the second enumeration exceeds the number of the first enumeration. In this example, determination module 110 may also determine which screenshots on the mobile computing system are the most recent screenshots in order to determine which screenshots were taken while the sensitive application was the foreground application. For example, if the first enumeration is seven and the second enumeration is nine, determination module 110 may identify the two most recent screenshots as taken while the sensitive application was the foreground application.

Using FIG. 5 as an example, at background switch 520 determination module 110 may compare an enumeration of screenshots taken before application launch 510 and an enumeration of screenshots taken before background switch 520 to determine that screenshots 512 and 514 were taken while the sensitive application was in the foreground. As another example, at application end 540 determination module 110 may compare an enumeration of screenshots taken before foreground switch 530 and an enumeration of screenshots taken before application end 540 to determine that screenshot 532 was taken while the sensitive application was in the foreground.

Returning to FIG. 3, at step 312 one or more of the systems described herein may perform a security action upon detecting the difference between the enumeration of screenshots and the second enumeration of screenshots. For example, at step 310 determination module 110 may, as part of mobile computing device 202 in FIG. 2, perform a security action upon detecting the difference between enumeration 232 of screenshots 230 and enumeration 234 of screenshots 230.

Determination module 110 may perform any of a variety of security actions. In one example, determination module 110 may delete the new screenshot to prevent an unauthorized transfer of data gathered from the sensitive application. For example, determination module 110 may remove the screenshot from a file system and/or database and/or overwrite the screenshot. In another example, determination module 110 may identify sensitive information contained within the new screenshot and then manipulate the new screenshot to remove the sensitive information. For example, determination module 110 may use an optical character recognition technology to identify sensitive text in the screenshot and then redact the sensitive text within the screenshot (e.g., by drawing over the sensitive text, blurring the sensitive text, etc.). As another example, determination module 110 may identify one or more marks in the screenshot identifying the sensitive data. For example, the sensitive application may mark sensitive data it displays by highlighting and/or demarcating the sensitive data. Determination module 110 may accordingly redact any data within the screenshot that was marked by the sensitive application. In some examples, the sensitive application may identify sensitive data by identifying areas in the screenshot where the sensitive application displays sensitive data, and removing, blocking, and/or redacting those areas of the screenshot.

In some examples, the security action may include generating a report indicating that the new screenshot was generated from a view of the sensitive application. For example, determination module 110 may generate a report send to an administrator and/or owner of data displayed by the sensitive application. In various examples the report may include an identifier of the mobile computing system, an identifier of the user of the mobile computing system, an identifier of the sensitive application, a copy of the screenshot, a summary of sensitive data contained and/or believed to be contained in the screenshot, and/or the time that the screenshot was taken.

As explained above, by monitoring or tracking a mobile computing system for new screenshots taken while an application that may display sensitive data is in the foreground, the systems and methods described herein may prevent unwanted copying and/or distribution of sensitive data displayed within the application. Furthermore, these systems and methods may do so while still conforming to strict mobile platform restrictions that may otherwise hamper traditional mobile data loss prevention systems. Additionally, these systems and methods may effectively protect sensitive data without requiring that the screenshot feature of a mobile computing system be entirely disabled. In some examples, these systems and methods may effectively operate without depending on details of the timing and/or notification mechanisms of a screenshot tool.

Figure 6:
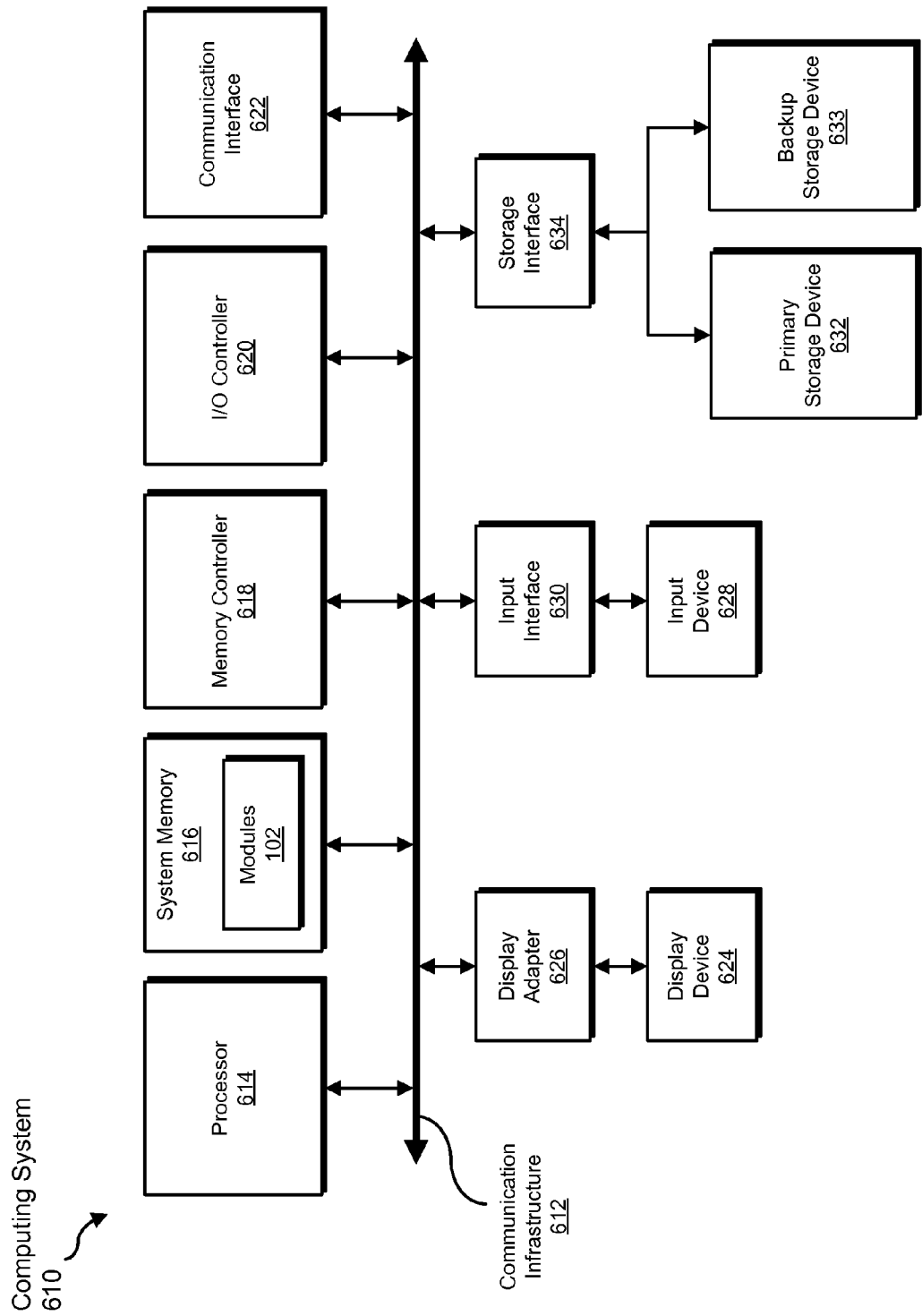
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, determining, enumerating, performing, deleting, manipulating, and/or generating steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
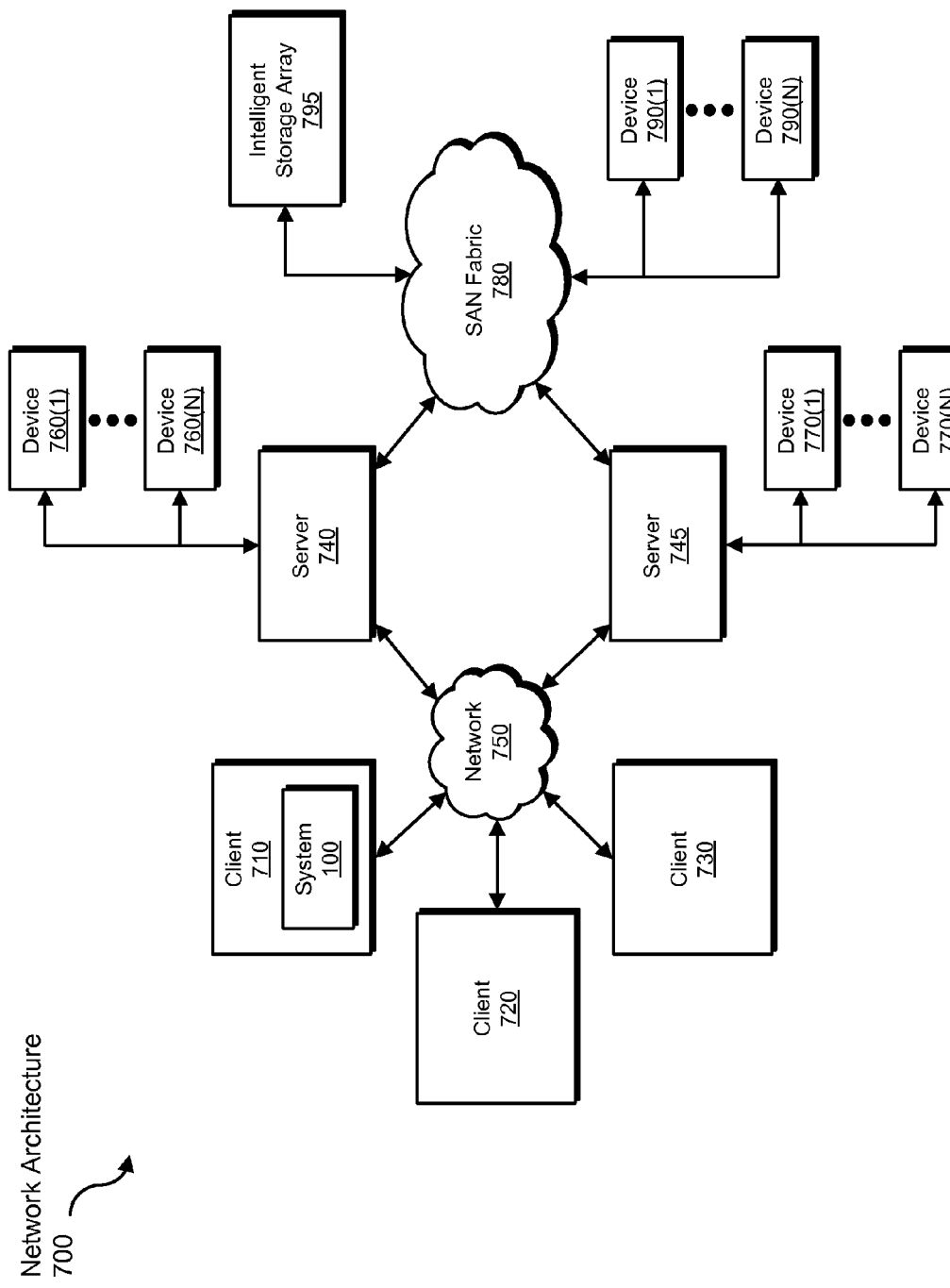
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, determining, enumerating, performing, deleting, manipulating, and/or generating steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for data loss prevention on mobile computing systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a mobile computing device into a secure mobile computing device for displaying sensitive data.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for data loss prevention on mobile computing systems, at least a portion of the method being performed by a computing device comprising at least one processor, the method comprising:
   identifying a mobile computing system, the mobile computing system being configured to execute only one application at a time as a foreground application;
   determining that the mobile computing system has begun executing a sensitive application as the foreground application, wherein the sensitive application displays information that is subject to a data-loss-prevention policy;
   in response to determining that the mobile computing system is executing the sensitive application as the foreground application, identifying a first enumeration of screenshots stored on the mobile computing system when the mobile computing system began executing the sensitive application as the foreground application;
   identifying a second enumeration of screenshots stored on the mobile computing system after the mobile computing system began executing the sensitive application as the foreground application;
   determining that at least one new screenshot was taken on the mobile computing system while the sensitive application was the foreground application by detecting a difference between the first enumeration of screenshots and the second enumeration of screenshots;
   performing a security action upon detecting the difference between the first enumeration of screenshots and the second enumeration of screenshots.

2. The computer-implemented method of claim 1,
   further comprising identifying a global screenshot location on the mobile computing system, the global screenshot location being designated for storing application-independent screenshots taken on the mobile computing system;
   wherein identifying the first enumeration of screenshots comprises enumerating screenshots stored at the global screenshot location.

3. The computer-implemented method of claim 1, wherein identifying the second enumeration of screenshots comprises:
   determining that the mobile computing system ceased executing the sensitive application as the foreground application;
   in response to determining that the mobile computing system ceased executing the sensitive application as the foreground application, enumerating screenshots stored on the mobile computing system when the mobile computing system ceased executing the sensitive application as the foreground application.

4. The computer-implemented method of claim 3, wherein determining that the mobile computing system ceased executing the sensitive application as the foreground application comprises determining that the mobile computing system switched the sensitive application from executing as the foreground application to being a background application.

5. The computer-implemented method of claim 1, wherein determining that the mobile computing system began executing the sensitive application as the foreground application comprises determining that the mobile computing system switched the sensitive application from being a background application to executing as the foreground application.

6. The computer-implemented method of claim 1, wherein performing the security action comprises deleting the new screenshot to prevent an unauthorized transfer of data gathered from the sensitive application.

7. The computer-implemented method of claim 1, wherein performing the security action comprises:
   identifying sensitive information contained within the new screenshot;
   manipulating the new screenshot to remove the sensitive information.

8. The computer-implemented method of claim 1, wherein performing the security action comprises generating a report indicating that the new screenshot was generated from a view of the sensitive application.

9. The computer-implemented method of claim 1, wherein identifying the second enumeration of screenshots comprises enumerating screenshots stored on the mobile computing system according to a periodic schedule.

10. The computer-implemented method of claim 1, wherein the mobile computing system is further configured with a foreground application display area for displaying the foreground application.

11. A system for data loss prevention on mobile computing systems, the system comprising:
    an identification module programmed to identify a mobile computing system, the mobile computing system being configured to execute only one application at a time as a foreground application;
    a monitoring module programmed to determine that the mobile computing system has begun executing a sensitive application as the foreground application, wherein the sensitive application displays information that is subject to a data-loss-prevention policy;
    an enumeration module programmed to:
      in response to determining that the mobile computing system is executing the sensitive application as the foreground application, identify a first enumeration of screenshots stored on the mobile computing system when the mobile computing system began executing the sensitive application as the foreground application;
      identify a second enumeration of screenshots stored on the mobile computing system after the mobile computing system began executing the sensitive application as the foreground application;
    a determination module programmed to determine that at least one new screenshot was taken on the mobile computing system while the sensitive application was the foreground application by detecting a difference between the first enumeration of screenshots and the second enumeration of screenshots;
    a performing module programmed to perform a security action upon detecting the difference between the first enumeration of screenshots and the second enumeration of screenshots;
    at least one processor configured to execute the identification module, the monitoring module, the enumeration module, the determination module, and the performing module.

12. The system of claim 11, wherein:
the enumeration module is further programmed to identify a global screenshot location on the mobile computing system, the global screenshot location being designated for storing application-independent screenshots taken on the mobile computing system;
the enumeration is programmed to identify the first enumeration of screenshots by enumerating screenshots stored at the global screenshot location.

13. The system of claim 11, wherein the enumeration module is programmed to identify the second enumeration of screenshots by:
determining that the mobile computing system ceased executing the sensitive application as the foreground application;
in response to determining that the mobile computing system ceased executing the sensitive application as the foreground application, enumerating screenshots stored on the mobile computing system when the mobile computing system ceased executing the sensitive application as the foreground application.

14. The system of claim 13, wherein the enumeration module is programmed to determine that the mobile computing system ceased executing the sensitive application as the foreground application by determining that the mobile computing system switched the sensitive application from executing as the foreground application to being a background application.

15. The system of claim 11, wherein the monitoring module is programmed to determine that the mobile computing system began executing the sensitive application as the foreground application by determining that the mobile computing system switched the sensitive application from being a background application to executing as the foreground application.

16. The system of claim 11, wherein the performing module is programmed to perform the security action by deleting the new screenshot to prevent an unauthorized transfer of data gathered from the sensitive application.

17. The system of claim 11, wherein the performing module is programmed to perform the security action by:
identifying sensitive information contained within the new screenshot;
manipulating the new screenshot to remove the sensitive information.

18. The system of claim 11, wherein the performing module is programmed to perform the security action by generating a report indicating that the new screenshot was generated from a view of the sensitive application.

19. The system of claim 11, wherein the enumeration module is programmed to identify the second enumeration of screenshots by enumerating screenshots stored on the mobile computing system according to a periodic schedule.

20. A computer-readable-storage medium comprising one or more computer-executable instructions that, when executed by at least one processor of a computing device, cause the computing device to:
identify a mobile computing system, the mobile computing system being configured to execute only one application at a time as a foreground application;
determine that the mobile computing system has begun executing a sensitive application as the foreground application, wherein the sensitive application displays information that is subject to a data-loss-prevention policy;
in response to determining that the mobile computing system is executing the sensitive application as the foreground application, identify a first enumeration of screenshots stored on the mobile computing system when the mobile computing system began executing the sensitive application as the foreground application;
identify a second enumeration of screenshots stored on the mobile computing system after the mobile computing system began executing the sensitive application as the foreground application;
determine that at least one new screenshot was taken on the mobile computing system while the sensitive application was the foreground application by detecting a difference between the first enumeration of screenshots and the second enumeration of screenshots;
perform a security action upon detecting the difference between the first enumeration of screenshots and the second enumeration of screenshots.

* * * * *